(12) United States Patent
Tsai et al.

(10) Patent No.: US 12,353,090 B2
(45) Date of Patent: Jul. 8, 2025

(54) ELECTRONIC DEVICE

(71) Applicant: InnoLux Corporation, Miao-Li County (TW)

(72) Inventors: Chia-Hao Tsai, Miao-Li County (TW); Ming-Jou Tai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/444,729

(22) Filed: Feb. 18, 2024

(65) Prior Publication Data

US 2024/0310670 A1 Sep. 19, 2024

Related U.S. Application Data

(60) Provisional application No. 63/452,443, filed on Mar. 16, 2023.

(30) Foreign Application Priority Data

Dec. 7, 2023 (CN) .......................... 202311669376.7

(51) Int. Cl.
  *G02F 1/1335* (2006.01)
  *G02F 1/1339* (2006.01)
  *G02F 1/1362* (2006.01)
  *G02F 1/1368* (2006.01)

(52) U.S. Cl.
  CPC .... *G02F 1/133512* (2013.01); *G02F 1/13394* (2013.01); *G02F 1/136286* (2013.01); *G02F 1/13685* (2021.01)

(58) Field of Classification Search
  None
  See application file for complete search history.

(56) References Cited

U.S. PATENT DOCUMENTS

2014/0009730 A1* 1/2014 Shim ................. G02F 1/133512
                                                    349/110

* cited by examiner

*Primary Examiner* — Dung T Nguyen
(74) *Attorney, Agent, or Firm* — Winston Hsu

(57) ABSTRACT

An electronic device includes a substrate and data lines, gate lines, spacers, a first light-shielding layer, a second light-shielding layer and a third light-shielding layer disposed on the substrate. The data lines and the gate lines respectively extend along a first direction and a second direction different from the first direction. The first light-shielding layer includes a plurality of first light-shielding elements arranged corresponding to the data lines respectively and extending along the first direction. The second light-shielding layer includes a plurality of second light-shielding elements arranged corresponding to the gate lines respectively and extending along the second direction. The third light-shielding layer is arranged corresponding to a part of the spacers. At the overlap of the first light-shielding layer, the second light-shielding layer and the third light-shielding layer, the first light-shielding layer, the second light-shielding layer and the third light-shielding layer have different the distances from the substrate respectively.

20 Claims, 10 Drawing Sheets

ELECTRONIC DEVICE

CROSS REFERENCE TO RELATED APPLICATION

This application claims the benefit of U.S. Provisional Application No. 63/452,443, filed on Mar. 16, 2023. The content of the application is incorporated herein by reference.

BACKGROUND OF THE DISCLOSURE

1. Field of the Disclosure

The present disclosure relates to an electronic device, and more particularly to an electronic device with display function.

2. Description of the Prior Art

In modern technology, displays or electronic devices containing display functions have been widely used in daily life. Generally speaking, a light-shielding layer with a specific pattern may be disposed in the electronic device to improve the contrast of the displayed image. However, when the resolution is required to increase continuously, it will be difficult to produce the light-shielding layer with predetermined pattern due to issues such as material limits, process requirements, material residues, etc., affecting the process yield, thereby increasing production costs.

SUMMARY OF THE DISCLOSURE

One of the objectives of the present disclosure is to provide an electronic device including a plurality of light-shielding layers having specific designed pattern, so as to increase the product yield, surface visual perception, and/or contrast of the electronic device.

The present disclosure electronic device includes a substrate, a plurality of data lines, a plurality of gate lines, a plurality of spacers, a first light-shielding layer, a second light-shielding layer and a third light-shielding layer. The data lines are disposed on the substrate and extend along a first direction. The gate lines are disposed on the substrate and extend along a second direction. The first direction is different from the second direction. The spacers are disposed on the substrate. The first light-shielding layer includes a plurality of first light-shielding elements arranged corresponding to one of the plurality of data lines respectively and extending along the first direction. The second light-shielding layer includes a plurality of second light-shielding elements arranged corresponding to one of the gate lines respectively and extending along the second direction. The third light-shielding layer is disposed corresponding to at least a portion of the spacers. At the overlap of the first light-shielding layer, the second light-shielding layer and the third light-shielding layer, the first light-shielding layer, the second light-shielding layer and the third light-shielding layer have different distance from the substrate respectively.

These and other objectives of the present disclosure will no doubt become obvious to those of ordinary skill in the art after reading the following detailed description of the embodiment that is illustrated in the various figures and drawings.

BRIEF DESCRIPTION OF THE DRAWINGS

Referring to FIG. 10.

DETAILED DESCRIPTION

Figure 1:
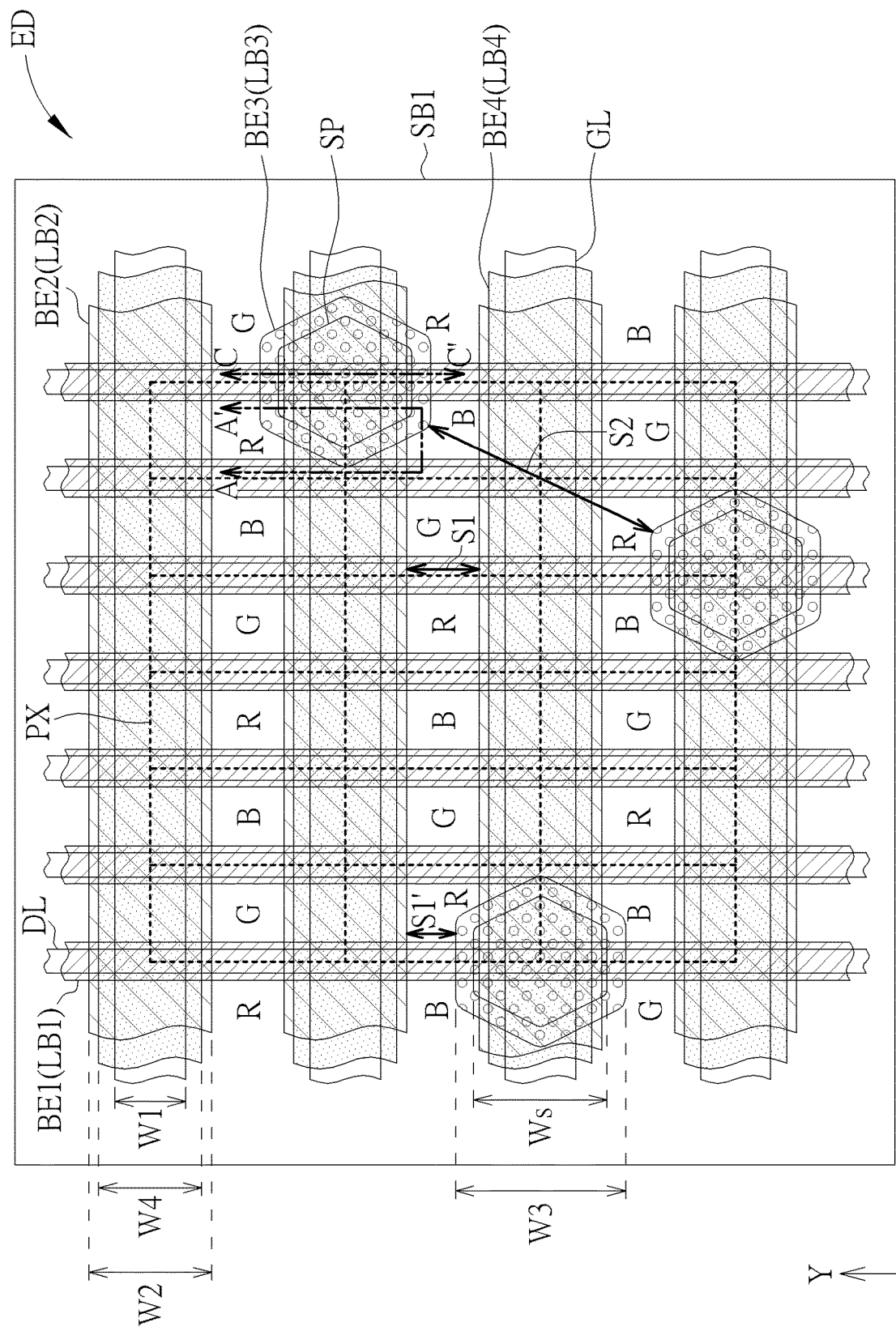
FIG. 1 is a schematic diagram of a partial top-view according to a first embodiment of the electronic device of the present disclosure.

The contents of the present disclosure will be described in detail with reference to specific embodiments and drawings. It is noted that, for purposes of illustrative clarity and being easily understood by the readers, the following drawings may be simplified schematic diagrams, and elements therein may not be drawn to scale. The numbers and sizes of the elements in the drawings are just illustrative and are not intended to limit the scope of the present disclosure.

Certain terms are used throughout the specification and following claims to refer to particular elements. Those skilled in the art should understand that electronic equipment manufacturers may refer to an element by different names. This document does not intend to distinguish between elements that differ in name but not function.

In the following description and claims, the terms "include", "comprise" and "have" are used in an open-ended fashion, and thus should be interpreted to mean "include, but not limited to . . . ". When the terms "include", "comprise" and/or "have" are used in this specification, they specify the presence of the features, regions, steps, operations and/or elements, but do not exclude the presence or addition of one or more other features, regions, steps, operations, elements and/or combinations thereof.

Ordinal numbers such as "first" and "second" in the specification and claims are used to distinguish/describe the elements in the claims. It does not mean that the claimed element has any previous ordinal numbers, nor does it mean the order of a certain element and another element, or the order in manufacturing method. The ordinal number is just used to make a claimed element with a certain name be clearly distinguishable from another claimed element with the same name.

Spatially relative terms, such as "above", "under", "left", "right", "front", "behind" and the like, used in the following embodiments just refer to the directions in the drawings and are not intended to limit the present disclosure. It should be understood that the elements in the drawings may be disposed in any kind of formation known by one skilled in the related art to describe the elements in a certain way.

In addition, when an element or layer is described as being on or above another element or layer, it should be understood that the element or layer is directly on the another element or layer, and alternatively, another element or layer may be between the element or layer and the another element or layer (indirectly). On the contrary, when the element or layer is described as being directly on the another element or layer, it should be understood that there is no intervening element or layer between them. When an element is electrically connected or coupled to another element, it may include the case that there may be conductive lines or passive components (e.g. resistor, capacitor, etc.) between the element and the another element to electrically connect them. No other electrical component between the element and the another element.

In this disclosure, the thickness, length and width may be measured by optical microscopy (OM), and the thickness or length may be measured by scanning electron microscope (SEM), but not limited thereto. The doping concentration of dopant may be measured by SEM, transmission electron microscope (TEM), X-ray photoelectron spectroscopy (XPS), energy-dispersive X-ray spectroscopy (EDS) or secondary ion mass spectrometer (SIMS), but not limited thereto. In addition, any two values or directions used for comparison may have certain errors.

In the specification, the terms "approximately", "about", "substantially", "roughly", and "same" generally mean within 10%, 5%, 3%, 2%, 1%, or 0.5% of the reported numerical value or range. The quantity disclosed herein is an approximate quantity, that is, without a specific description of "approximately", "about", "substantially", "roughly", and "same", the quantity may still include the meaning of "approximately", "about", "substantially", "roughly", and "same".

The electronic device in the present disclosure may include, but is not limited to, a display device, a light-emitting device, a backlight device, a virtual reality (VR) device, an antenna device, a sensing device or a splicing device. The electronic device may be a bendable or flexible electronic device. The display device may be a non-self-luminous display device or a self-luminous display device. The antenna device may be a liquid crystal antenna device or a non-liquid-crystal antenna device, and the sensing device may be a sensing device for sensing capacitance, light, heat energy or ultrasonic waves, but not limited thereto. Electronic devices may include passive components and active components, such as capacitors, resistors, inductors, diodes and transistors. Diodes may include light emitting diodes or photodiodes. The light-emitting diode may include, for example, an inorganic light emitting diode, an organic light emitting diode (OLED), a mini LED, a micro LED or a quantum dot LED, but not limited thereto. The tiled device may be, for example, a display tiled device or an antenna tiled device, but not limited thereto. It should be noted that the electronic device may be any combination as mentioned above, but not limited thereto. In addition, the display device may be, for example, in a shape of rectangular, circular, polygonal, a shape with curved edges, a curved surface, or other suitable shapes. An electronic device may have a peripheral system such as a drive system, a control system, a light source system to support a display device, an antenna device, a wearable device (e.g. including augmented reality or virtual reality), a vehicle-mounted device (e.g. including vehicle windshield) or a tiled device.

It should be noted that in the following embodiments, the technical features of several different embodiments may be disassembled, replaced, recombined and mixed to complete other examples without departing from the spirit of the present disclosure.

Figure 2:
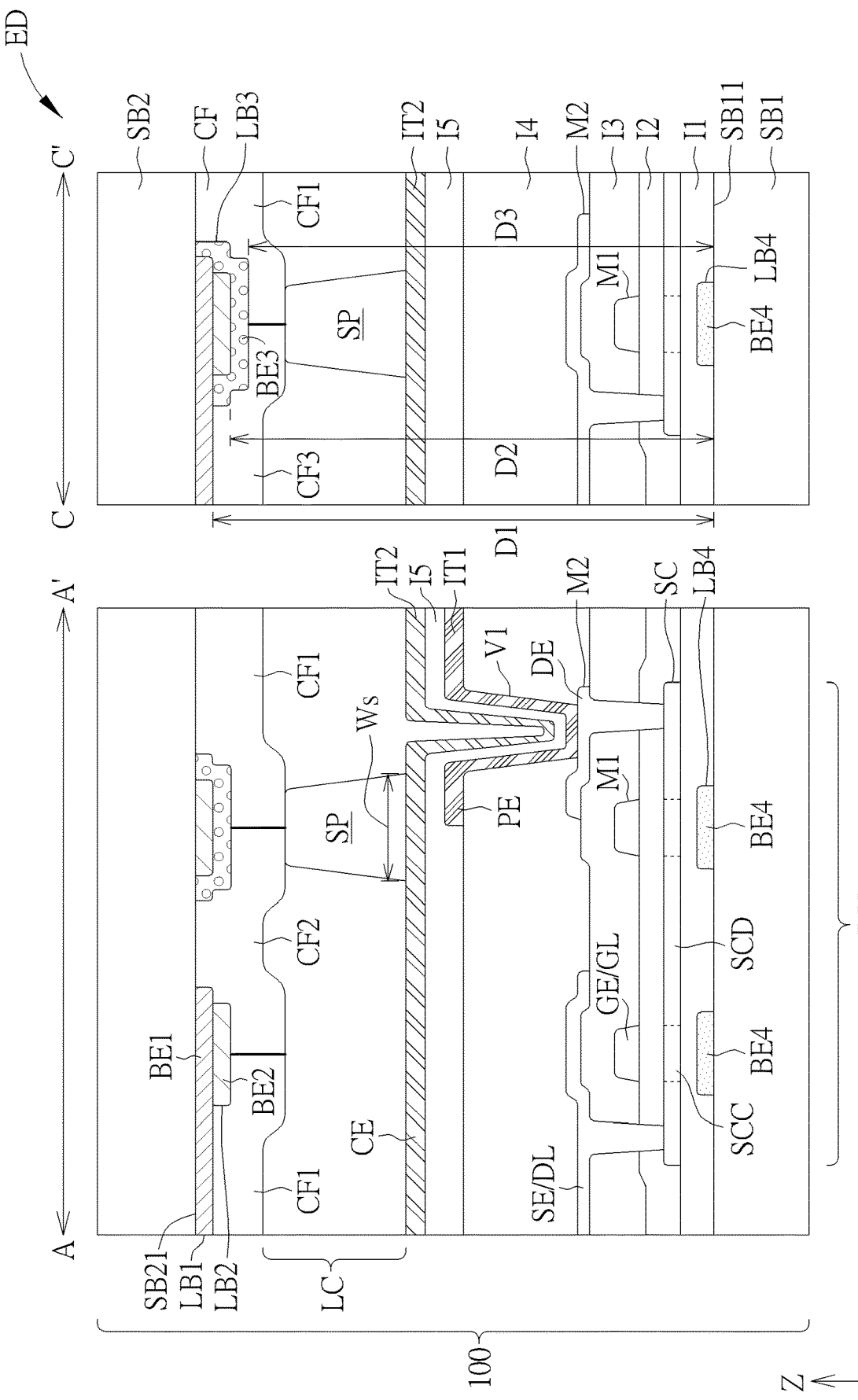
FIG. 2 is a schematic diagram of a partial sectional-view along the cross-sectional line A-A' and the cross-sectional line C-C' of the electronic device shown in FIG. 1.

Referring to FIG. 1 and FIG. 2, FIG. 1 is a schematic diagram of a partial top-view according to a first embodiment of the electronic device of the present disclosure, and FIG. 2 is a schematic diagram of a partial sectional-view along the cross-sectional line A-A' and the cross-sectional line C-C' of the electronic device shown in FIG. 1. In order to simplify the figure, a portion of elements of the electronic device are omitted in FIG. 1. The electronic device ED of the present disclosure includes a substrate SB1, at least one data lines DL, at least one gate lines GL, at least one spacer SP, and a plurality of light-shielding layers (such as the light-shielding layer LB1, the light-shielding layer LB2, the light-shielding layer LB3 and the light-shielding layer LB4), wherein the data line DL is disposed on the substrate SB1 and extends along a first direction Y, the gate line GL is disposed on the substrate SB1 and extends a long a second direction X, and the first direction Y is different from the second direction X. For example, the first direction Y may be perpendicular to the second direction X, but not limited thereto. In this embodiment, the electronic device ED includes a plurality of spacers SP, a plurality of data lines DL arranged parallel to each other and side by side, and a plurality of gate lines GL arranged parallel to each other and side by side. The gate lines GL and the data lines DL cross with each other to define a plurality of sub-pixels PX. When the electronic device ED has a display function, the area containing the sub-pixels PX may be regarded as the display region or active region of the electronic device ED, and the side of the substrate SB1 where the gate lines GL and data lines DL are disposed (i.e., the upper side of FIG. 2) may be regarded as the display side of the electronic device ED. Furthermore, each sub-pixel PX may correspond to a color individually, which means that it may emit light of a specific color, but not limited thereto. In the sub-pixels PX of the embodiment shown in FIG. 1, the letter "G" represents the green sub-pixel, the letter "B" represents the blue sub-pixel, and the letter "R" represents the red sub-pixel. In a lateral row, the green sub-pixels, blue sub-pixels and red sub-pixels are arranged in sequence alternately; in a straight line, the green sub-pixels, red sub-pixels and blue sub-pixels are arranged in sequence alternately, so three kinds of sub-pixels PX may appear in the same row or the same line. In this embodiment, a blue sub-pixel PX, a green sub-pixel PX and a red sub-pixel PX may compose one pixel. However, in variant embodiments, the numbers of different colors of sub-pixels PX in a single pixel may not be exactly the same. It should be noted that the color, type and arrangement of the sub-pixels PX included in the present disclosure electronic device ED are not limited to the above. The spacers SP are disposed on substrate SB1, and may be located on the side of the gate lines GL and data lines DL opposite to the substrate SB1. Specifically, the spacers SP may be disposed on the gate lines GL and/or data lines DL. There is a specific distance between two adjacent spacers SP. For example, two adjacent spacers SP will not be disposed in adjacent sub-pixels PX. The spacers SP may be substantially disposed at the intersection of the gate lines GL and the data lines DL. In other words, each spacer SP may overlap a portion of one gate line GL and a portion of one data line DL at the same time in a top-view direction, opposite to the third direction Z but parallel to the normal of substrate SB1, of the electronic device ED. The spacers SP may also be disposed at the intersection of different sub-pixels PX and partially overlap these sub-pixels PX respectively. The total area of all spacers SP overlapping the green sub-pixels PX may be less than the total area overlapping the blue sub-pixels PX and less than the total area overlapping the red sub-pixels PX, wherein this design may reduce the impact of spacers SP on the green sub-pixels PX and improve the visual perception. The arrangement location of the spacers SP mentioned above may be applied to other embodiments of the present disclosure and will not be described again.

The electronic device ED of the present disclosure also includes a light-shielding layer LB1, a light-shielding layer LB2 and a light-shielding layer LB3. The light-shielding layer LB1 includes a plurality of light-shielding elements BE1, which is arranged corresponding to one of the data lines DL respectively and extends along the first direction Y The light-shielding layer LB2 includes a plurality of light-shielding elements BE2, which is arranged corresponding to one of the gate lines GL respectively and extends along the second direction X. The light-shielding layer LB3 includes a plurality of light-shielding elements BE3, the patterns and dispositions of which correspond to at least one portion of the spacers SP. In this embodiment, each spacer SP corresponded with one light-shielding element BE3, and the pattern of the light-shielding element BE3 is slightly greater than the pattern of the corresponding spacers SP. Accordingly, the spacers SP is overlapped by the light-shielding elements BE3 and the pattern of the spacers SP is slightly smaller than the pattern of the light-shielding elements BE3 and is located within the light-shielding elements BE3 in the top view. The above description of "one component is arranged corresponding to another component" or "one component corresponds to another component" refers to one component overlaps or partially overlaps another component and these two components have similar patterns in the top view. For example, the patterns of the data lines DL are parallel to the first direction Y and have a long strip shape, then the patterns of the light-shielding elements BE1 corresponding to the data lines DL are also parallel to the first direction Y and have similar long strip shapes. However, the sizes of the data lines DL and the light-shielding elements BE1 may be different. In FIG. 1, the width of the light-shielding elements BE1 in the second direction X may be slightly greater than the width of the data lines DL in the second direction X. In the display region, the length of the light-shielding elements BE1 in the first direction Y may be approximately the same as the length of the data lines DL in the first direction Y, but the present disclosure is not limited to the above. The length of the light-shielding elements BE1 in the first direction Y may be greater than, equal to or less than the length of the data lines DL in the first direction Y in different embodiments. Similarly, in FIG. 1, the width W2 of the light-shielding elements BE2 in the first direction Y may be slightly greater than the width W1 of the gate lines GL in the first direction Y In the display region, the length of the light-shielding elements BE2 in the second direction X may be approximately the same as the length of the gate lines GL in the second direction X, but the present disclosure is not limited to the above. Furthermore, in FIG. 1, the top-view shape of the spacers SP may be approximate hexagonal (with six rounded corners for example) or approximate circle, while the patterns of the light-shielding elements BE3 of the light-shielding layer LB3 may be approximate hexagons that are slightly greater than the spacers SP. For example, the maximum width W3 of the light-shielding elements BE3 in the first direction Y is slightly greater than the maximum width Ws of the spacers SP in the first direction Y In a cross-sectional figure, such as FIG. 2, the maximum width Ws may be defined by the width of the bottom of the spacers SP. However, the patterns of the spacers SP and the light-shielding elements BE3 of the present disclosure are not limited to the above, and may also have other suitable patterns. The above meanings of "one component corresponds to another component" and "one component is arranged corresponding to another component" apply to following descriptions and will not be described again.

In some embodiments, the electronic device ED may further include a substrate SB2, which is disposed opposite to the substrate SB1, and the light-shielding layer LB1, the light-shielding layer LB2 and the light-shielding layer LB3 may be disposed on the inner surface SB21 of the substrate SB2, but not limited thereto. In this embodiment, the light-shielding layer LB1, the light-shielding layer LB2 and the light-shielding layer LB3 may be disposed in sequence on the inner surface SB21 of the substrate SB2. Since the light-shielding layer LB1, the light-shielding layer LB2 and the light-shielding layer LB3 have different patterns individually; the light-shielding layer LB1, the light-shielding layer LB2 and the light-shielding layer LB3 will overlap or not overlap with each other as the change of the patterns at different locations. In other words, the stacking way between the light-shielding layer LB1, the light-shielding layer LB2 and the light-shielding layer LB3 may be different at different locations of the electronic device ED. At the overlap of the light-shielding layer LB1, the light-shielding layer LB2 and the light-shielding layer LB3 in the cross-sectional structure along cross-sectional line C-C' shown in FIG. 2, the minimum distance between the light-shielding layer LB1 and the substrate SB1 is defined as the distance D1, the minimum distance between the light-shielding layer between LB2 and the substrate SB1 is defined as the distance D2, the minimum distance between the light-shielding layer LB3 and the substrate SB1 is defined as the distance D3, and the distance D1, the distance D2 and the distance D3 are different from each other. As shown in FIG. 2, the distance D3 may be less than the distance D2, and the distance D2 may be less than the distance D1, but the present disclosure are not limited thereto.

The light-shielding layer LB1, the light-shielding layer LB2 and the light-shielding layer LB3 may include dark-colored organic photosensitive materials, which may be patterned through an exposure process respectively. For example, these light shielding layers may include black matrix materials respectively. In this embodiment, the light-shielding layer LB1 corresponds to the data lines DL, which means the pattern of the light-shielding elements BE1 is parallel to the first direction Y; and the light-shielding layer LB2 corresponds to the gate lines GL, which means the pattern of the light-shielding elements BE2 is parallel to the second direction X. Therefore, both the patterns of the light-shielding layer LB1 and the light-shielding layer LB2 have simple shapes of long strips. Accordingly, when performing the exposure process to pattern the light-shielding layer LB1 and the light-shielding layer LB2 respectively, a better patterning pattern can be obtained. Specifically, when a single-layer of the light-shielding layer with a grid shape is traditionally used to simultaneously shield the structure of the data lines and gate lines, the patterning performance will be worse as the resolution of the electronic device is higher. In contrast, since the present disclosure uses different layers of the light-shielding layer LB1 and the light-shielding layer LB2 to respectively shield the data lines DL and the gate lines GL (either corresponding to or overlapping the data lines DL and the gate lines GL respectively), the exposure performance of the light-shielding layer LB1 and the light-shielding layer LB2 are good because the patterns of the light-shielding layer LB1 and the light-shielding layer LB2 are simple; even in the electronic device ED with high-resolution, they may be patterned well, seldom affecting the aperture ratio of each sub-pixel PX. Furthermore, this embodiment uses another layer of the light-shielding layer LB3 to be arranged corresponding to the spacers SP settings, instead of using the light-shielding layer LB1 and the light-shielding layer LB2 to correspond to the spacers SP, such that the light-shielding elements BE3 of the light-shielding layer LB3 have a certain distance therebetween. For example, adjacent (or nearest) light-shielding elements BE3 may be separated by at least one light-shielding element BE2 or at least one light-shielding element BE1. In this case, even if the electronic device ED has a very high resolution, it is easier to achieve a good patterning performance of the exposure process of the light-shielding layer LB3. According to the present disclosure, the shortest distance S1 between adjacent light-shielding elements BE2 may be greater than 1.5 micrometers (micron, μm) and less than 15 micrometers, and the shortest distance S2 between adjacent light-shielding elements BE3 may be greater than 1.5 micrometers and less than 40 micrometers. Under the above design, both the distance S1 and the distance S2 may be greater than 1.5 micrometers, thus they will not be too small to exceed the process limit (or critical dimension) of the light-shielding layer material (i.e., the exposure limit of organic materials), and therefore the patterning performance is good and may form a predetermined pattern, while light-shielding elements BE2 and light-shielding elements BE3 may still have large enough pattern shapes to shield the gate lines GL and the spacers SP respectively. On the contrary, if one single light-shielding layer is used to shield both the gate lines GL and the spacers SP at the same time, the shortest distance S1' between patterns may be too small and exceed the process limit of the light-shielding layer, resulting in poor exposure performance and affecting the pattern of The light-shielding layer, thereby affecting the aperture ratio. The design implications and intentions of the above-mentioned electronic device with high resolution and having plural light-shielding elements with different patterns individually are applicable to other embodiments of the present disclosure and will not be described again. In some embodiments, the light-shielding elements BE2 may overlap with the gate lines GL, and the light-shielding elements BE1 may overlap with the data lines DL.

Furthermore, the electronic device ED of the present disclosure may further include a light-shielding layer LB4 disposed between the gate lines GL and the substrate SB1, as shown in FIG. 2. The light-shielding layer LB4 may include a plurality of light-shielding elements BE4. In this embodiment, the light-shielding elements BE4 may be arranged corresponding to the gate lines GL, that is, the light-shielding elements BE4 may have a long strip shape extending along the second direction X. In the display region, the length of the light-shielding elements BE4 in the second direction X may be approximately the same as the length of the gate lines GL, but not limited thereto. As shown in FIG. 1, the length of the light-shielding elements BE4 in the second direction X is greater than double of the pixel pitch of the sub-pixels PX in the second direction X. In another aspect, the width W4 of the light-shielding elements BE4 in the first direction Y may be for example slightly greater than the width W1 of the gate lines GL in the first direction Y, but not limited thereto. In some embodiments, the width W4 of the light-shielding elements BE4 may be slightly less than the width W2 of the light-shielding elements BE2, but not limited thereto. In a variant embodiment, the width W4 may be greater than or substantially the same as the width W2. The light-shielding layer LB4 may include a conductive material, such as a metal material, or may be a metal layer, or the light-shielding layer LB4 may include any material with a light-shielding function that can be disposed on the inner surface SB11 of the substrate SB1. The light-shielding layer LB4 is closer to the substrate SB1 in comparison with the light-shielding layer LB1, the light-shielding layer LB2 and the light-shielding layer LB3. It should be noted that the light-shielding layer LB4 is not limited to be disposed between the substrate SB1 and gate lines GL as shown in FIG. 2. For example, in other embodiments, the light-shielding layer LB4 may be disposed on the gate lines GL or the data lines DL, but the present disclosure is not limited to the above.

In some embodiments, each sub-pixel PX may correspond to and include a driving element DV. The driving element DV is, for example, a thin film transistor. In some embodiments, the driving element DV may be replaced by a switching element. The driving element DV includes a source. SE, a drain DE, a gate GE and a semiconductor layer SC. The source SE may be a part of the data lines DL, and the gate GE may be a part of the gate lines GL. The semiconductor layer SC may have a U-shaped pattern and include a channel region SCC and a heavily doped region SCD, wherein the heavily doped regions SCD at both ends of the semiconductor layer SC may serve as the source region and the drain region respectively, contacting and electrically connected to the source SE and the drain DE respectively. In some embodiments, the light-shielding elements BE4 may further be used as the lower gate, forming a dual-gate or double-gate thin film transistor structure together with the top-gate thin film transistor structure.

Referring to FIG. 2, the relative arrangements between layers and elements on the substrate SB1 of the electronic device ED of the present disclosure will be introduced in the following. On the substrate SB1, the patterned light-shielding layer LB4, an insulating layer I1, the patterned semiconductor layer SC, an insulating layer I2, a patterned first conductive layer M1, an insulating layer I3, a patterned second conductive layer M2, an insulating layer I4, a patterned third conductive layer IT1, an insulating layer I5 and a fourth conductive layer IT2 are disposed in sequence. The substrate SB1 may include a hard substrate or a flexible substrate, but not limited thereto. The material of the substrate SB1 may include, for example, glass, quartz, sapphire, ceramic, polyimide (PI), polycarbonate (PC), polyethylene terephthalate (PET), other suitable materials or a combination of the above materials. The semiconductor layer SC may include any suitable semiconductor material (e.g., including silicon or metal oxide) such as low temperature polycrystalline silicon semiconductor, amorphous silicon (a-Si) semiconductor, indium gallium zinc oxide (IGZO) semiconductor or other suitable semiconductor, but not limited thereto. The semiconductor layer SC of this embodiment takes a semiconductor material including low temperature polysilicon as an example. The patterned first conductive layer M1 may form the gages GE and the gate lines GL. The patterned second conductive layer M2 may form the sources SE, the data lines DL and the drains DE, wherein each source SE may be in direct contact with and electrically connected to the heavily doped region SCD serving as the source region through the contact hole in the insulating layer I3 and insulating layer I2, and each drain DE may be in direct contact with and electrically connected to the heavily doped region SCD serving as the drain region through the contact hole in the insulating layer I3 and insulating layer I2. The insulating layer I4 is disposed on the data lines DL and includes a contact hole V1 which exposes a portion of the drain DE, and the third conductive layer IT1 composes a transparent electrode PE (such as serving as a pixel electrode) which may be in direct contact with and electrically connected to the drain DE through the contact hole V1. A portion of the insulating layer I5 and a portion of the fourth conductive layer IT2 may be disposed in the contact hole V1, and the insulating layer I5 is disposed between the fourth conductive layer IT2 and the third conductive layer IT1 such that the fourth conductive layer IT2 and the transparent electrode PE disposed in the contact hole V1 are insulated from each other. In this embodiment, the portion of the fourth conductive layer I2 disposed at the upper side of the transparent electrode PE may serve as a common electrode CE, but not limited thereto. The first conductive layer M1 and the second conductive layer M2 may include may individually include metal materials, wherein the metal materials include, for example, aluminum, molybdenum, copper, titanium, other suitable materials or a combination of at least two of the above, but not limited thereto. The insulating layer I1, the insulating layer I2, the insulating layer I3, the insulating layer I4 and the insulating layer I5 may individually include inorganic or organic insulating materials. Inorganic materials may include, for example, silicon oxide (SiOx), silicon nitride (SiN), silicon oxynitride (SiOxNy) or other suitable materials or a combination of the above materials, but not limited thereto. For example, the insulating layer I4 may include an organic material and serve as a planarization layer, and the insulating layer I5 may include an inorganic material and serve as a passivation layer, but not limited to the above. In some embodiments, the light-shielding layer LB4 may be disposed between the fourth conductive layer IT2 and the insulating layer I5, or the fourth conductive layer IT2 may be disposed between the light-shielding layer LB4 and the insulating layer I5, but the present disclosure is not limited thereto. It should be noted that the above-described disposing position of the light-shielding layer LB4 and the disposing position of the light-shielding layer LB4 shown in FIG. 2 may be applied to other embodiments of the present disclosure and will not be described again.

Furthermore, when the electronic device ED of this embodiment is applied as a display device, it may further include a display medium layer LC disposed between the substrate SB1 and the substrate SB2. The display medium layer LC includes, for example, a liquid crystal layer, but is not limited thereto. In this embodiment, the display medium layer LC is disposed on the data lines DL and gate lines GL, and the display medium layer LC is disposed between the light-shielding layer LB1, light-shielding layer LB2, and the light-shielding layer LB3 and the gate lines GL. A filter layer CF may be further disposed on the inner surface SB21 of the substrate SB2. The filter layer CF may include, for example, a color filter CF1, a color filter CF2 and a color filter CF3, which may respectively correspond to one of the red subpixel PX, blue red sub-pixel PX and green red sub-pixel PX, but not limited to. The electronic device ED of the present disclosure may further include an optical conversion layer (also called as light converting layer, not shown in the figure) disposed on the surface of the substrate SB2, and a polarizer (not shown) may also be disposed on the surfaces of the substrate SB2 and the substrate SB1 respectively, but not limited to the above. It may be seen from the above that the substrate SB1 and the film layer/component provided on its surface, the display medium layer LC, and the substrate SB2 and the film layer/component provided on its surface may constitute a display panel 100.

According to the first embodiment of the present disclosure, the light-shielding layer LB1 with longitudinally extending patterns may be used to shield the data lines DL, and the light-shielding layer LB2 with laterally extending patterns may be used to shield the gate lines GL, while the light-shielding layer LB3 having a block-shaped or dot-shaped pattern may be used to shield the spacers SP. In other words, different film layers are used for to shield the data lines DL, the gate lines GL and the spacers SP respectively. This design makes the light-shielding elements (such as light-shielding elements BE2) in the same layer of the light-shielding layer (such as the light-shielding layer LB2) can have a large enough interval to meet the material process limitations and obtain good exposure effects, thereby reducing material residue problems and achieving good process yields. Furthermore, since the data lines DL, gate lines GL and spacers SP may be fully shielded, the problem of light crossing interference between the sub-pixels PX may be mitigated and/or the light leakage occurring near the shielded spacers SP may be shielded, thereby improving the contrast of the displayed image and/or improving visual perception.

The electronic device of the present disclosure is not limited to the above embodiments. Further embodiments or variant embodiments of the electronic device of the present disclosure will be described below. To compare the embodiments or the variant embodiments conveniently and simplify the description, the same component would be labeled with the same symbol in the following, and repeated parts will not be redundantly described. The differences between different embodiments will be mainly described in the following. The various embodiments of the present disclosure can be combined with each other and adjusted.

Figure 3:
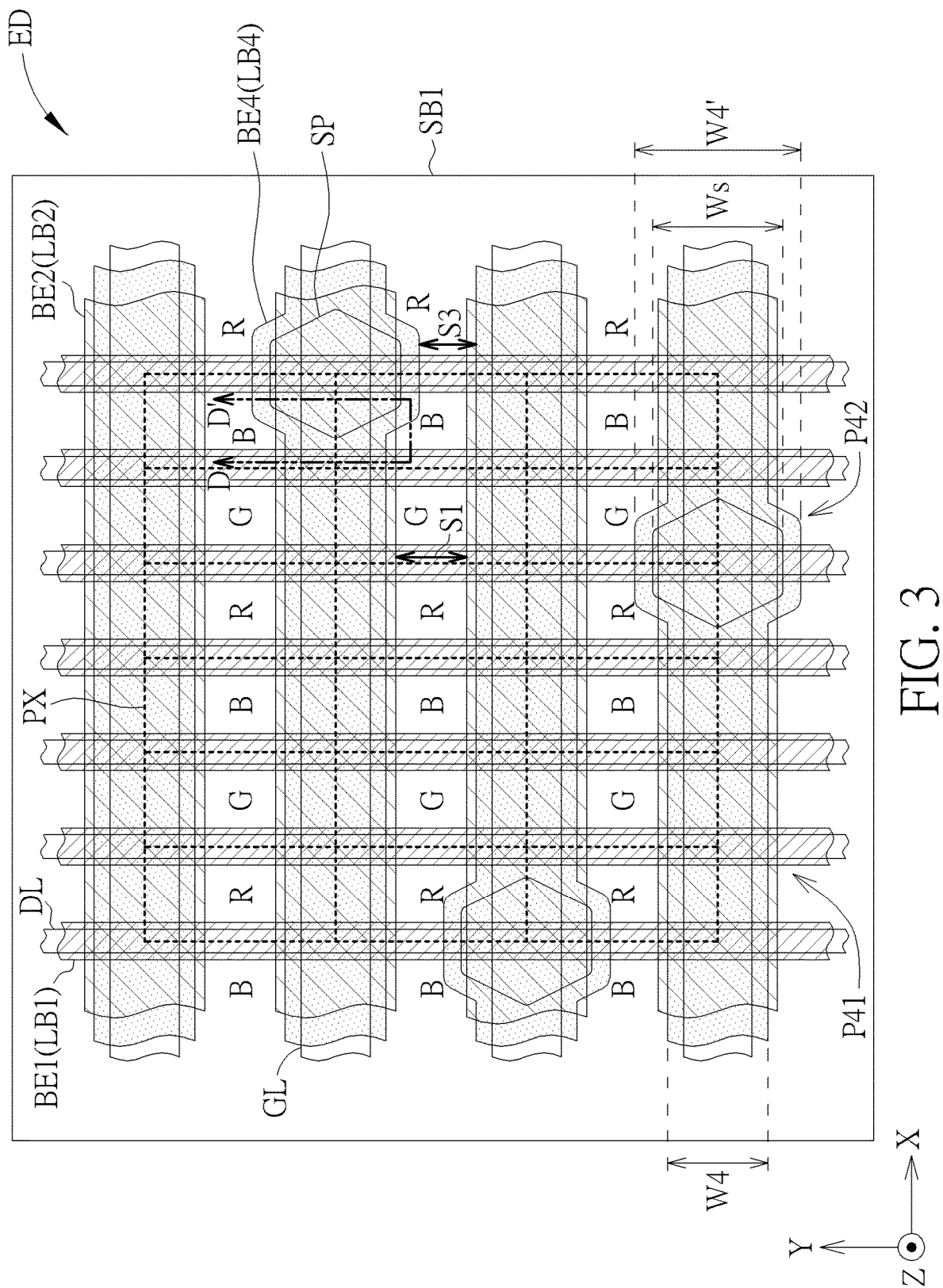
FIG. 3 is a schematic diagram of a partial top-view according to a second embodiment of the electronic device of the present disclosure.
Figure 4:
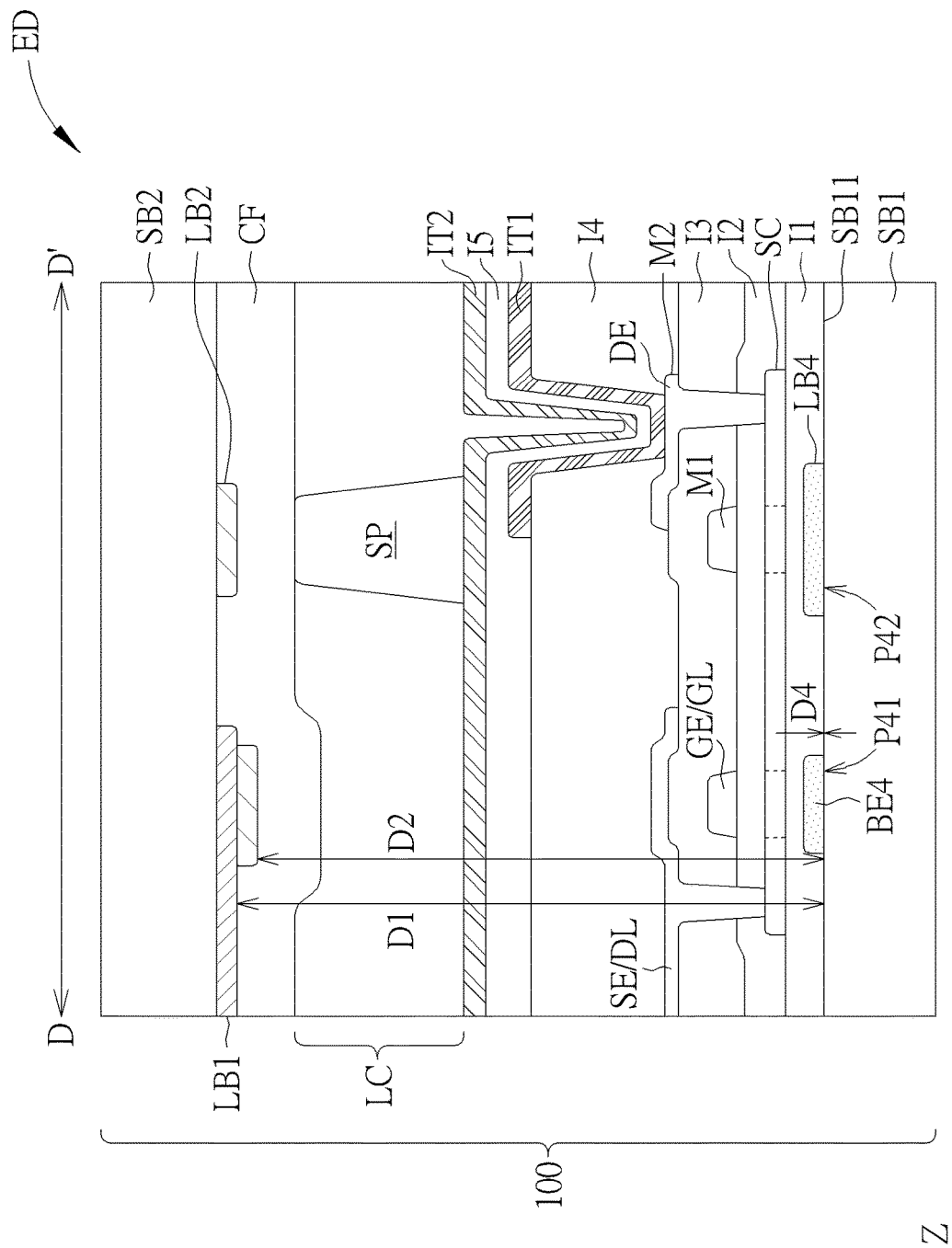
FIG. 4 is a schematic diagram of a partial sectional-view along the cross-sectional line D-D' of the electronic device shown in FIG. 3.

Referring to FIG. 3 and FIG. 4, FIG. 3 is a schematic diagram of a partial top-view according to a second embodiment of the electronic device of the present disclosure, and FIG. 4 is a schematic diagram of a partial sectional-view along the cross-sectional line D-D' of the electronic device shown in FIG. 3. Compared with the first embodiment, the present disclosure electronic device ED of the second embodiment may not have a light-shielding layer LB3, and the light-shielding elements BE4 of the light-shielding layer LB4 are used to be arranged corresponding to the spacers SP, so as to mitigate the light leakage problem occurring near the spacers SP or improve the visual perception. Specifically, the light-shielding elements BE4 may extend along the second direction X, and the width of one single light-shielding element BE4 in the first direction Y is not identical, that is, one single light-shielding element BE4 may have multiple widths in the first direction Y One light-shielding element BE4 includes a plurality of first portions P41 and a plurality of second portions P42, wherein the second portions P42 are the part of the light-shielding element BE4 corresponding to the spacers SP and the first portions P41 are the part of the light-shielding element BE4 not corresponding to the spacers SP, or the first portions P41 are the part of the light-shielding element BE4 corresponding to the portion of the gate lines GL not overlapped with the spacers SP. The first portions P41 are strip-shaped and extend along the second direction X, and one first portion P41 is located between two second portions P42. The first portion P41 may have a width W4 in the first direction Y, and the second portion P42 may have a maximum width W4' in the first direction Y, wherein the width W4' is greater than the width W4, and the width W4' may be greater than the maximum width Ws of the spacers SP in the first direction Y Compared with the first embodiment, the light-shielding elements BE4 in the electronic device ED shown in FIG. 3 can replace the light-shielding elements BE3 of the light-shielding layer LB3 of the electronic device ED shown in FIG. 1. Under this design, a fixed width W2 of the light-shielding elements BE2 can be kept, so as to maintain the interval between adjacent light-shielding elements BE2 (i.e., the shortest distance S1) with greater distance; for example, the distance S1 may be greater than 1.5 micrometers and less than 15 micrometers, but not limited thereto. Furthermore, the shortest distance S3 between adjacent light-shielding elements BE4 is the shortest distance from the second portion P42 of one light-shielding element BE4 to the first portion P41 of another adjacent light-shielding element BE4, and the distance S3 may be greater than 0.5 micrometers and less than 10 micrometers according to this embodiment. Since the light-shielding layer LB4 can include a metal layer or may be formed of a metal layer, the exposure limit (or process window) of the metal material is relatively large, and the patterning performance can be better than that of organic material, so even if the distance S3 in this embodiment is small and falls within the above range, a pattern with good fineness and accuracy can still be obtained through exposure procedure in the patterning process. Compared with other structures with the design of using adjacent patterns of the organic light-shielding layer LB2 to shield the gate lines GL and the spacers SP at the same time, the design of using metal light-shielding layer LB4 to shield the gate lines GL and the spacers SP in this embodiment can still maintain a good yield.

Furthermore, referring to FIG. 4, at the overlap of the light-shielding layer LB1, the light-shielding layer LB2, and the light-shielding layer LB4, the distances between these three film layers and the substrate SB1 are different respectively. Wherein, the distance D1 between the light-shielding layer LB1 and the substrate SB1 may be greater than the distance D2 between the light-shielding layer LB2 and the substrate SB1, and the distance D2 may be greater than the distance D4 between light-shielding layer LB4 and the substrate SB1. In the embodiment shown in 4, the distance D4 is, for example, 0 micrometer, which means the light-shielding layer LB4 may be directly disposed on the inner surface SB11 of the substrate SB1 and in direct contact with the substrate SB1, but not limited thereto. In other embodiments, the light-shielding layer LB4 may not be directly disposed on the inner surface SB11 of the substrate SB1, which means there may be other film layer(s) disposed between the light-shielding layer LB4 and the substrate SB1 and the distance D4 may be greater than 0 micrometer.

In another aspect, in the electronic device ED shown in FIG. 3, the sub-pixels PX of different colors may be arranged in different straight lines respectively, such as blue sub-pixel lines, red sub-pixel lines and green sub-pixel lines from left to right, arranged in sequence by turns. Under this design, the spacers SP may be disposed at the junctions of the blue sub-pixel PX and the red sub-pixel PX to reduce the impact on the visual performance of the green sub-pixel PX. The arrangement of the sub-pixels PX and the disposition location of the spacers SP may be applied to other embodiments of the present disclosure, and will not be described again.

Figure 5:
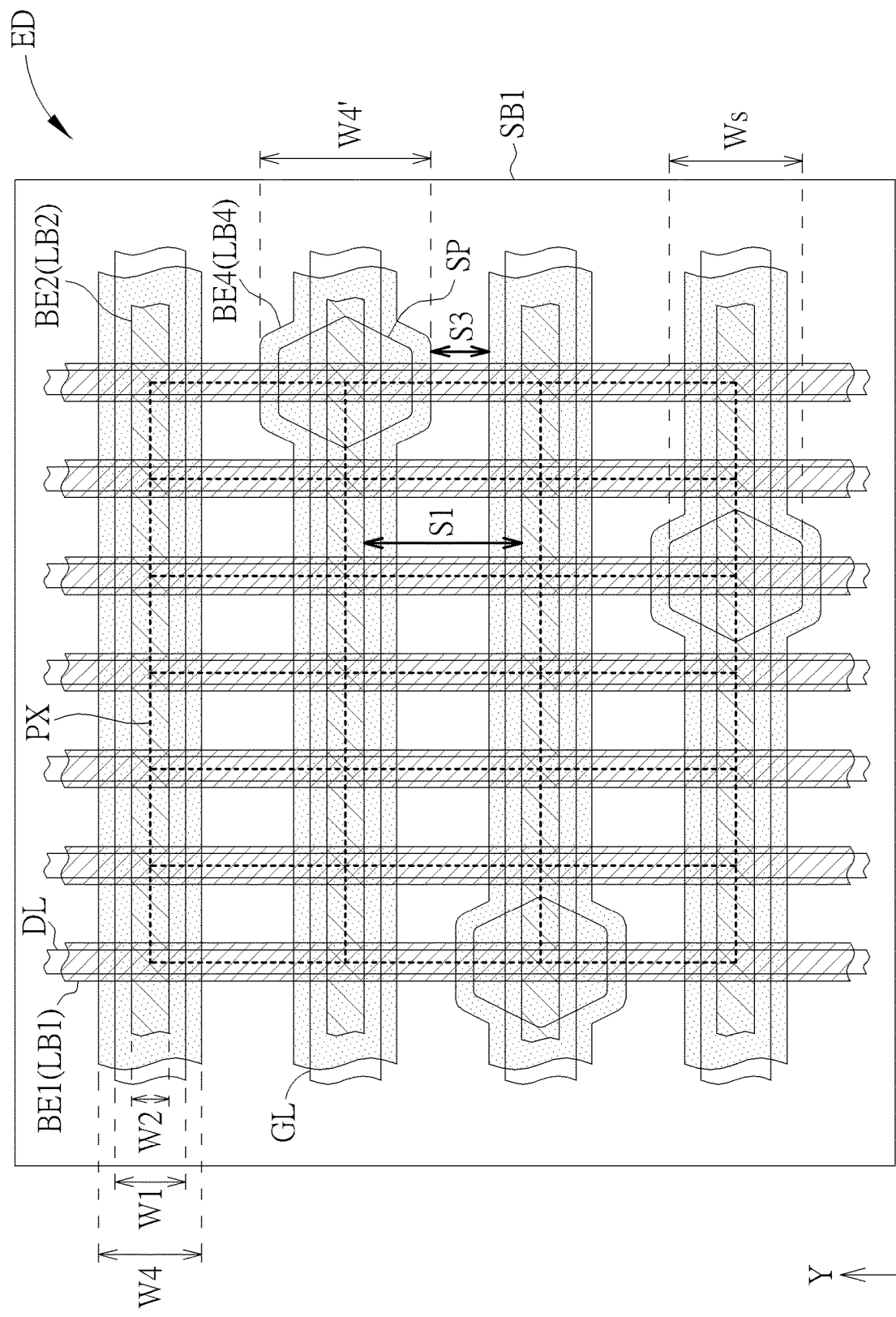
FIG. 5 is a schematic diagram of a partial top-view according to a third embodiment of the electronic device of the present disclosure.

Referring to FIG. 5, FIG. 5 is a schematic diagram of a partial top-view according to a third embodiment of the electronic device of the present disclosure. Compared with the embodiment shown in FIG. 3, the light-shielding elements BE2 of the light-shielding layer LB2 of the electronic device ED shown in FIG. 5 has a smaller width W2 in the first direction Y For example, the width W2 may be slightly smaller than the width W1 of the gate lines GL in the first direction Y, but not limited thereto. In variant embodiments, the width W2 may be equal to the width W1 but still smaller than the minimum width W4 of the light-shielding elements BE4 of the light-shielding layer LB4 in the first direction Y Furthermore, as shown in FIG. 5, due to the gate lines GL are not completely shielded by the light-shielding layer LB2 in the top-view direction (i.e., viewing direction of display surface of the electronic device ED), low-reflective metal material or dark metal material may be selected to from the gate lines GL, but not limited thereto. In variant embodiments, since a portion of the gate lines GL is still shielded by the light-shielding layer LB2, the gate lines GL may also be formed of the conductive materials other than the above-mentioned materials, or may be formed of the materials the same as the conductive material of the data lines DL. In this embodiment, although the width W2 of each light-shielding element BE2 is smaller, its linear pattern extending along the second direction X still provides the effect to increase the contrast. In addition, the light-shielding element BE2 has thinner width W2, so the shortest distance S1 between adjacent light-shielding elements BE2 in the first direction Y is also greater than that of the previous embodiments. For example, the maximum value of the distance S1 may reach 20 micrometer (the range of the distance S1: $1.5\ \mu m \leq S1 \leq 20\ \mu m$, but not limited to). Under this design, the greater distance S1 may make the light-shielding layer LB2 have a good patterning performance in the exposure process. In this embodiment, the light-shielding layer LB4 disposed on the lower side of the gate lines GL is used as the main lateral (along the second direction X) light-shielding elements, while the light-shielding layer LB2 disposed on the upper side of gate lines GL may further improve the contrast. Similar to the second direction embodiment, when using the light-shielding layer LB4 as the main lateral light-shielding elements that shield the gate lines GL and spacers SP and the light-shielding layer LB4 may be a metal layer, even the shortest distance S3 between adjacent light-shielding elements BE4 is smaller, for example in the range of 0.5 micrometers to 10 micrometer, the light-shielding layer LB4 may still have good exposure performance and process yields may still be obtained.

Figure 6:
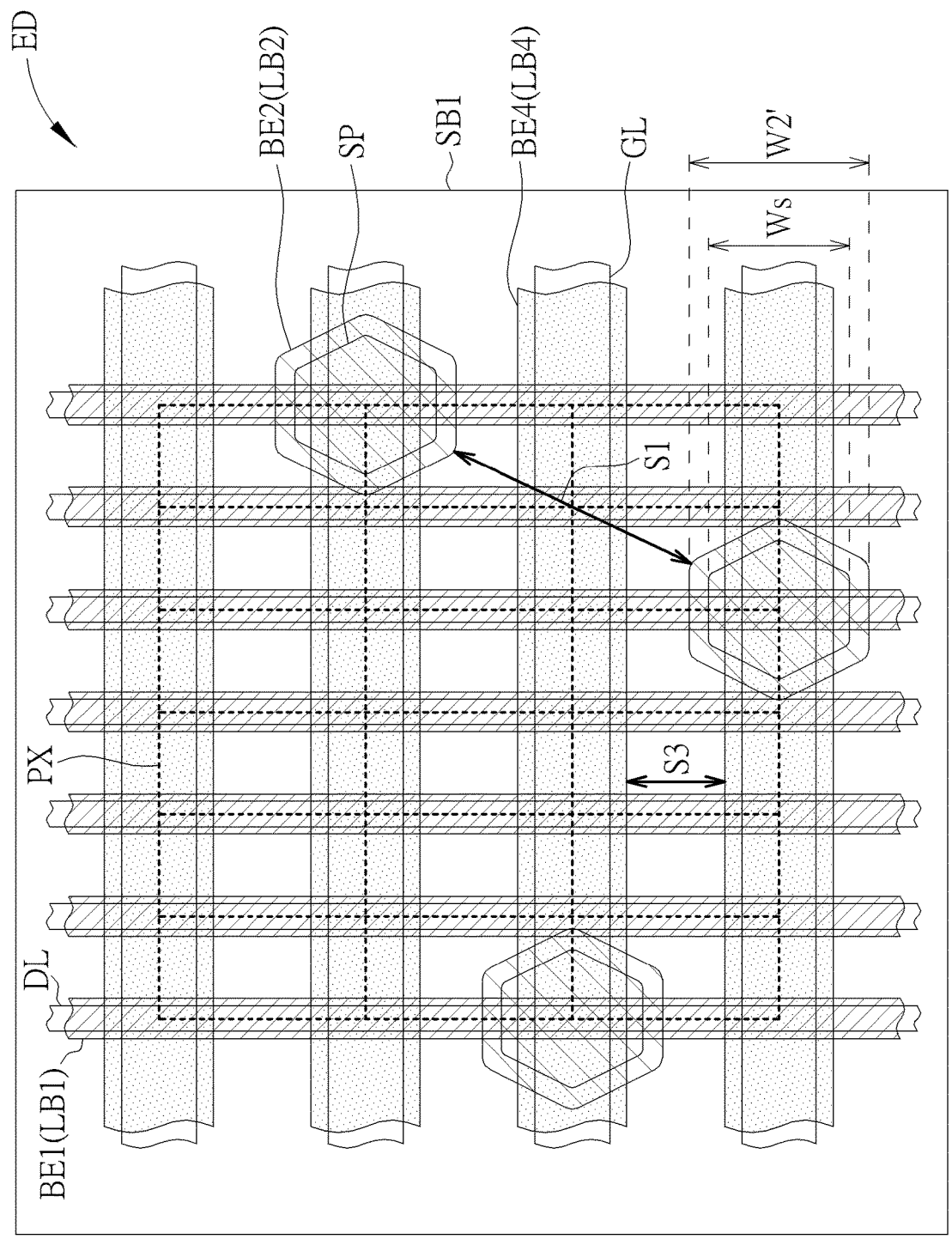
FIG. 6 is a schematic diagram of a partial top-view according to a fourth embodiment of the electronic device of the present disclosure.

Referring to FIG. 6, FIG. 6 is a schematic diagram of a partial top-view according to a fourth embodiment of the electronic device of the present disclosure. Compared with the embodiment shown in FIG. 1, the light-shielding layer LB2 of the electronic device ED shown in FIG. 6 replaces the light-shielding layer LB3 in the electronic device ED sown in FIG. 1, that is, the light-shielding elements BE2 of the light-shielding layer LB2 in FIG. 6 are arranged corresponding to the spacers SP, and the patterns and shapes of the light-shielding elements BE2 may correspond or be similar to the spacers SP, but slightly greater than the spacers SP. For example, the maximum width of the spacers SP in the first direction Y is defined as the width Ws, and the maximum width W2' of the light-shielding elements BE2 in the first direction Y is slightly greater than the width Ws. Furthermore, in this embodiment, the light-shielding elements BE2 have a block-shaped or dot-shaped pattern (such as the hexagonal pattern shown in FIG. 6, but not limited thereto) corresponding to the spacers SP, and the light-shielding elements BE2 do not have a laterally extending strip pattern corresponding to the gate lines GL. Therefore, the upper side of most part of the gate lines GL is no provided with the light-shielding layer LB2, but the light-shielding elements BE4 of the light-shielding layer LB4 on the lower side of the gate lines GL are used as the main lateral light-shielding elements. Under this design, low-reflective metal materials or dark metal materials may be chosen to form the gate lines GL, but not limited thereto. As shown in FIG. 6, since the light-shielding elements BE2 of the light-shielding layer LB2 may be used only to shield the spacers SP, the distance S1 between adjacent light-shielding elements BE2 can be even larger. For example, its maximum value can reach 40 micrometer (the range of the distance S1: 1.5 μm≤S1≤40 μm, but not limited thereto). Therefore, the light-shielding layer LB2 including black matrix materials or other organic photosensitive materials can have a good patterned performance in the exposure process, thus further improving the process yield.

Figure 7:
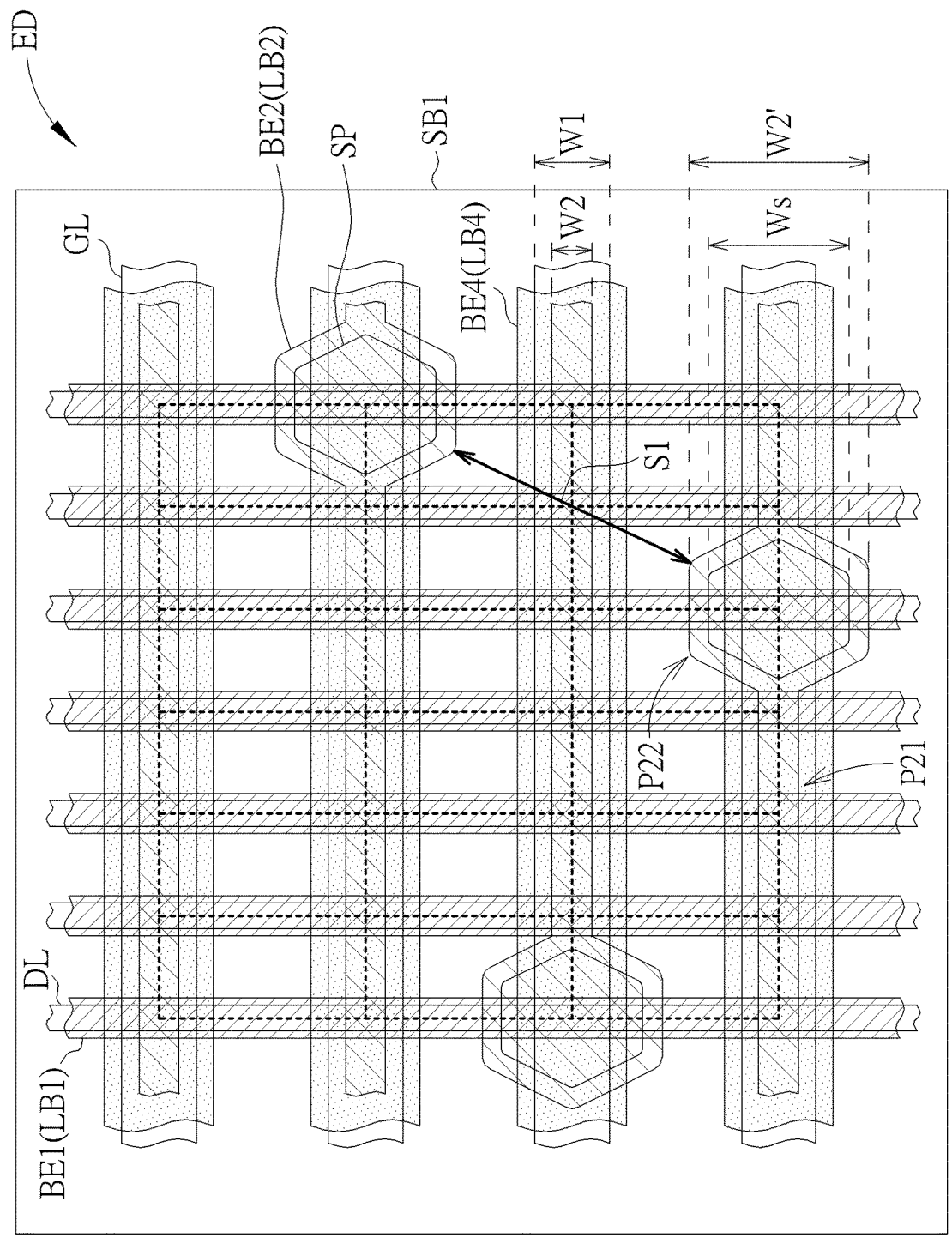
FIG. 7 is a schematic diagram of a partial top-view according to a fifth embodiment of the electronic device of the present disclosure.

Referring to FIG. 7, FIG. 7 is a schematic diagram of a partial top-view according to a fifth embodiment of the electronic device of the present disclosure. Compared with the embodiment shown in FIG. 6, the light-shielding layer LB2 on the upper side of the gate lines GL of the present disclosure corresponds to both the gate lines GL and the spacers SP. In detail, each light-shielding elements BE2 of the light-shielding layer LB2 includes the first portions P21 and the second portions P22, where the first portion P21 is disposed corresponding to at least one portion of the gate lines GL and extending along the second direction X to have a strip shape, and the second portion P22 is disposed corresponding to one spacer SP and has a block-shape or dot-shape pattern similar to the corresponding spacer SP. The maximum width W2 of the first portion P21 is smaller than the maximum width W2' of the second portion P22 in the first direction Y In this embodiment, the width W2 may be smaller than the width W1 of the gate lines GL, and the width W2' is greater than the maximum width Ws of the spacers SP in the first direction Y Under this design, the first portion P21 of the light-shielding elements BE2 can improve the contrast of the display device ED, and at the same time, the second portion P22 of the light-shielding elements BE2 is used to shield the spacers SP, which can mitigate the light leakage affect or improve the visual perception of the display surface of the electronic device ED.

Figure 8:
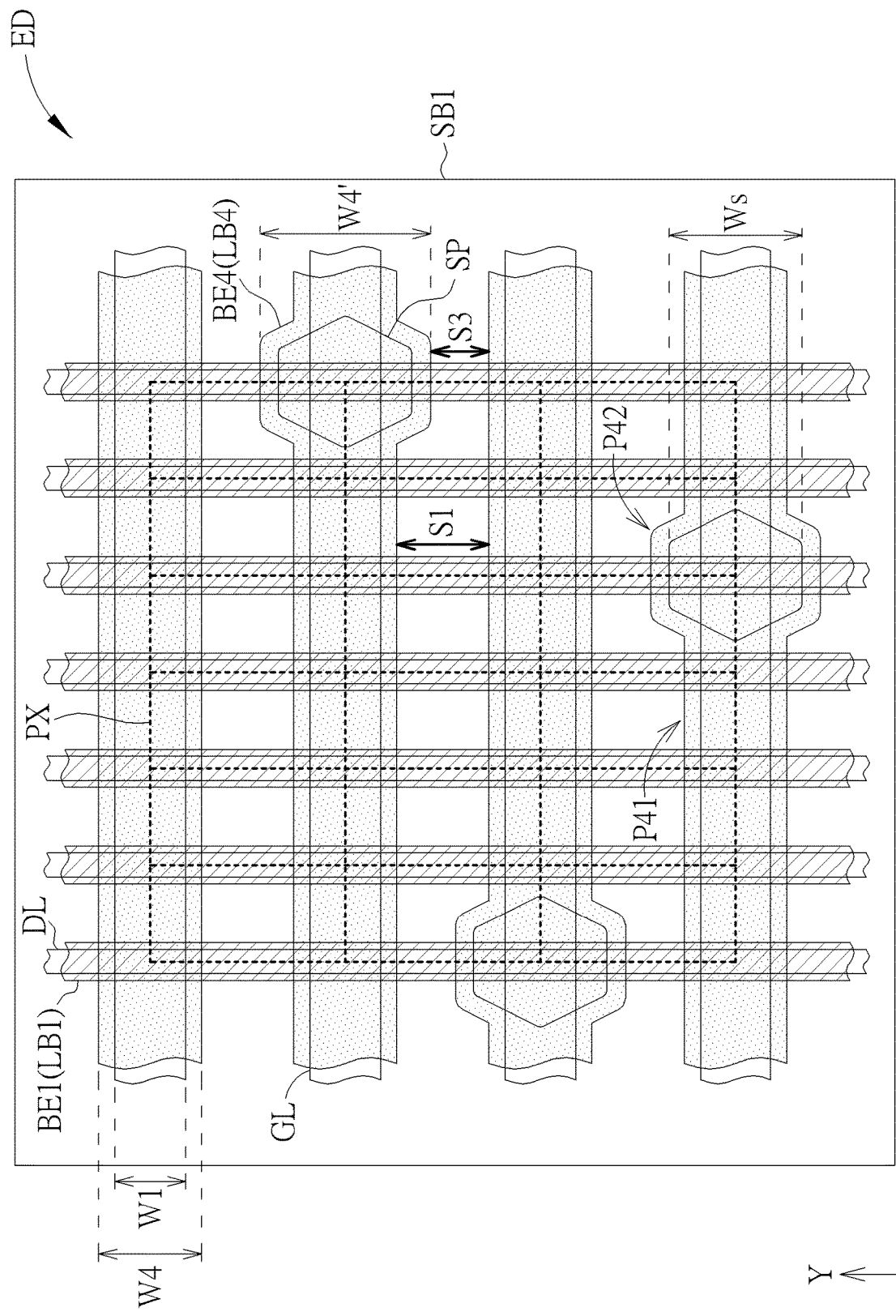
FIG. 8 is a schematic diagram of a partial top-view according to a sixth embodiment of the electronic device of the present disclosure.

Referring to FIG. 8, FIG. 8 is a schematic diagram of a partial top-view according to a sixth embodiment of the electronic device of the present disclosure. Compared with the embodiment shown in FIG. 3, the electronic device ED shown in FIG. 8 has no light-shielding layer LB2. Accordingly, the light-shielding elements BE1 of the light-shielding layer LB1 are used as the main longitudinal (first direction Y) light-shielding elements, corresponding to the data lines DL, and the light-shielding elements BE4 of the light-shielding layer LB4 are used as the main horizontal light-shielding elements, corresponding to the gate lines GL. In addition, the light-shielding elements BE4 are also arranged corresponding to the spacers SP. In detail, the light-shielding elements BE4 includes the first portions P41 and the second portions P42, where the first portions P41 laterally extend and have a strip pattern, corresponding to the most portion of the gate lines GL, and the second portions P42 have a block-shaped or dot-shaped pattern, corresponding to the spacers SP. Under this design, there is no light-shielding layer with a horizontally extending pattern disposed on the upper side of the gate lines GL, thus low-reflective metal materials or dark metal materials may be chosen to form the gate lines GL, but not limited thereto.

Figure 9:
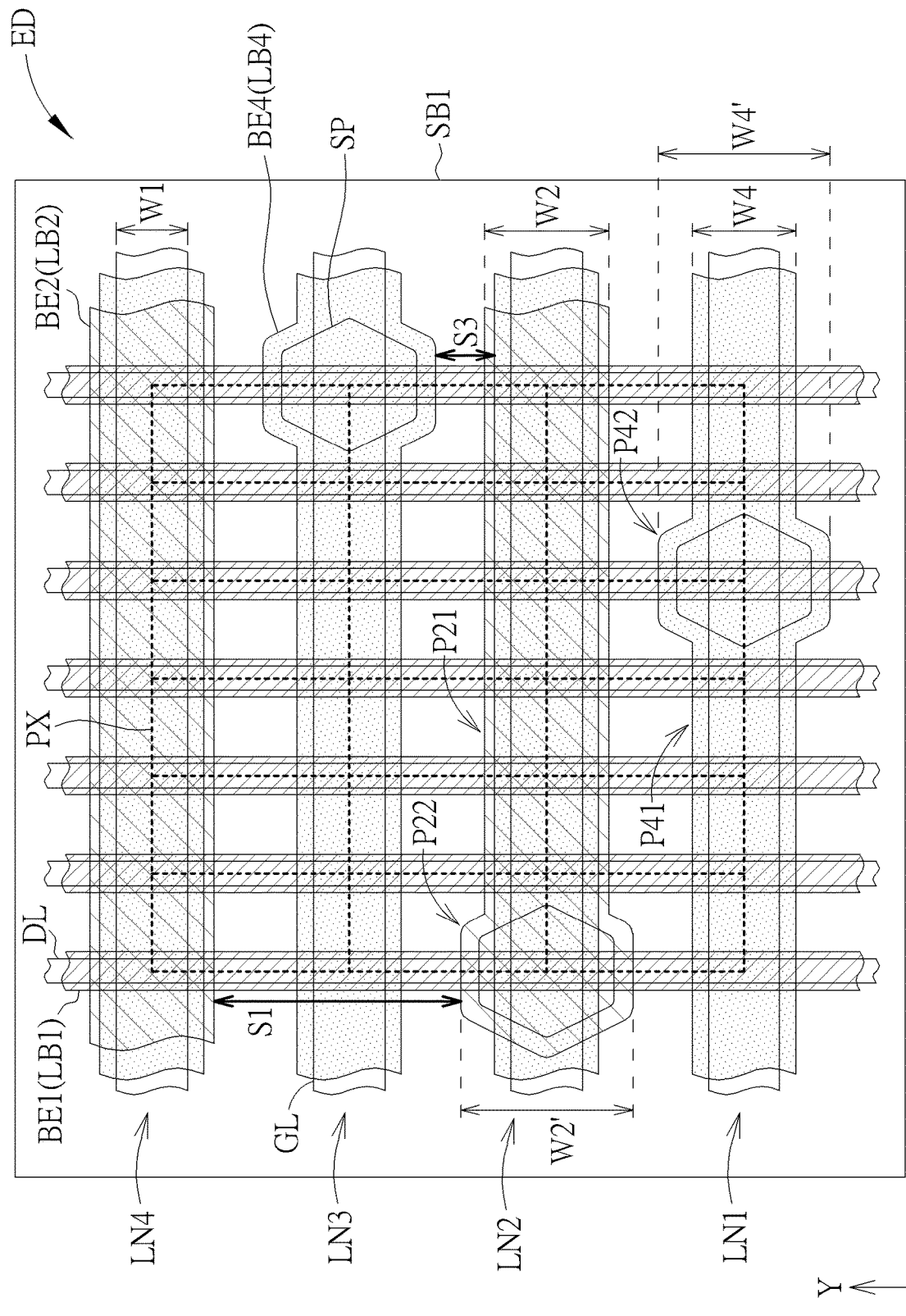
FIG. 9 is a schematic diagram of a partial top-view according to a seventh embodiment of the electronic device of the present disclosure.

Referring to FIG. 9, FIG. 9 is a schematic diagram of a partial top-view according to a seventh embodiment of the electronic device of the present disclosure. In the embodiment shown in FIG. 9, the light-shielding layer LB2 and the light-shielding layer LB4 are used to shield spacers SP alternately. In detail, FIG. 9 shows the gate lines GL include the first line LN1, the second line LN2, the third line LN3 and the fourth line LN4, and the electronic device ED may include multiple spacers SP respectively disposed on different gate lines GL. The light-shielding elements BE4 corresponding to the odd-number gate lines GL (such as the first line LN1 and the third line LN3) may have the second portions P42, wherein the second portions P42 respectively correspond to one spacer SP on the odd-number gate lines GL, and the light-shielding elements BE4 corresponding to the even-number gate lines GL (such as the second line LN2 and the fourth line LN4) do not have the second portion P42. In addition, the light-shielding elements BE4 further includes the first portions P41 extending laterally and connected to the second portions P42 of the light-shielding elements BE4. In another aspect, there are light-shielding elements BE2 disposed on the upper side of the even-numbered gate lines GL, and these light-shielding elements BE2 have the second portions P22, which are respectively disposed corresponding to the spacers SP on the even-numbered gate lines GL. At the same time, each light-shielding elements BE2 also includes a laterally extending first portion P21, which is connected to the second portion P22 of the same light-shielding element BE2. In this embodiment, there are no corresponding light-shielding elements BE2 disposed on the odd-numbered gate lines GL, and therefore the interval (or spacing) between two adjacent light-shielding elements BE2 in the first direction Y is greater than the pixel pitch (or pixel size) of the sub-pixels PX in the first direction Y. As mentioned above in other embodiments, the first portions P21 of the light-shielding elements BE2 have a smaller width W2, and the second portions P22 has a greater width W2' so as to effectively shield the spacers SP. Since the adjacent light-shielding elements BE2 are arranged sequentially with a gate line GL apart, compared with the aforementioned other embodiments, the distance S1 between adjacent light-shielding elements BE2 in the first direction Y can be increased, and its range can be from 1.5 micrometers to as high as 30 micrometers (the range of the distance S1: 1.5 μm≤S1≤30 μm, but not limited to). When the distance S1 increases, the light-shielding elements LB2 may have a better patterning performance. In another aspect, the first portions P41 of the light-shielding elements BE4 have width W4 and the second portions P42 have a width W4', thus the minimum distance S3 between adjacent light-shielding elements BE4 can still be maintained in the range of 0.5 micrometers to 10 micrometers, which will not exceed the exposure limit of the light-shielding layer LB4 including metal materials, so the patterned light-shielding elements BE4 can still have a fine, accurate and complete pattern. In a variant embodiment, the width W2 of the first portions P21 of the light-shielding elements BE2 corresponding to the even-numbered gate lines GL in the first direction Y may be smaller than the width W1 of the gate lines GL in the first direction Y, and the pattern of the first portions 21 with the above-mentioned smaller width W2 may refer to FIG. 5, while the light-shielding elements BE2 are still not disposed on the odd-numbered gate lines GL. In another variant embodiment, the light-shielding elements BE2 with a width W2 smaller than the gate lines GL may be disposed on the odd-numbered gate lines GL, while the light-shielding elements BE2 on the even-numbered gate lines GL remain the same width W2 (greater than gate lines GL) as shown in FIG. 9. In still another variant embodiment, the light-shielding elements BE2 with a smaller width W2 may be disposed on all of the gate lines GL, but the light-shielding elements BE2 on the even-numbered gate lines GL may include the second portions P22 to shield the spacers SP, while the light-shielding elements BE2 on the odd-numbered gate lines GL do not include the second portions P22.

Figure 10:
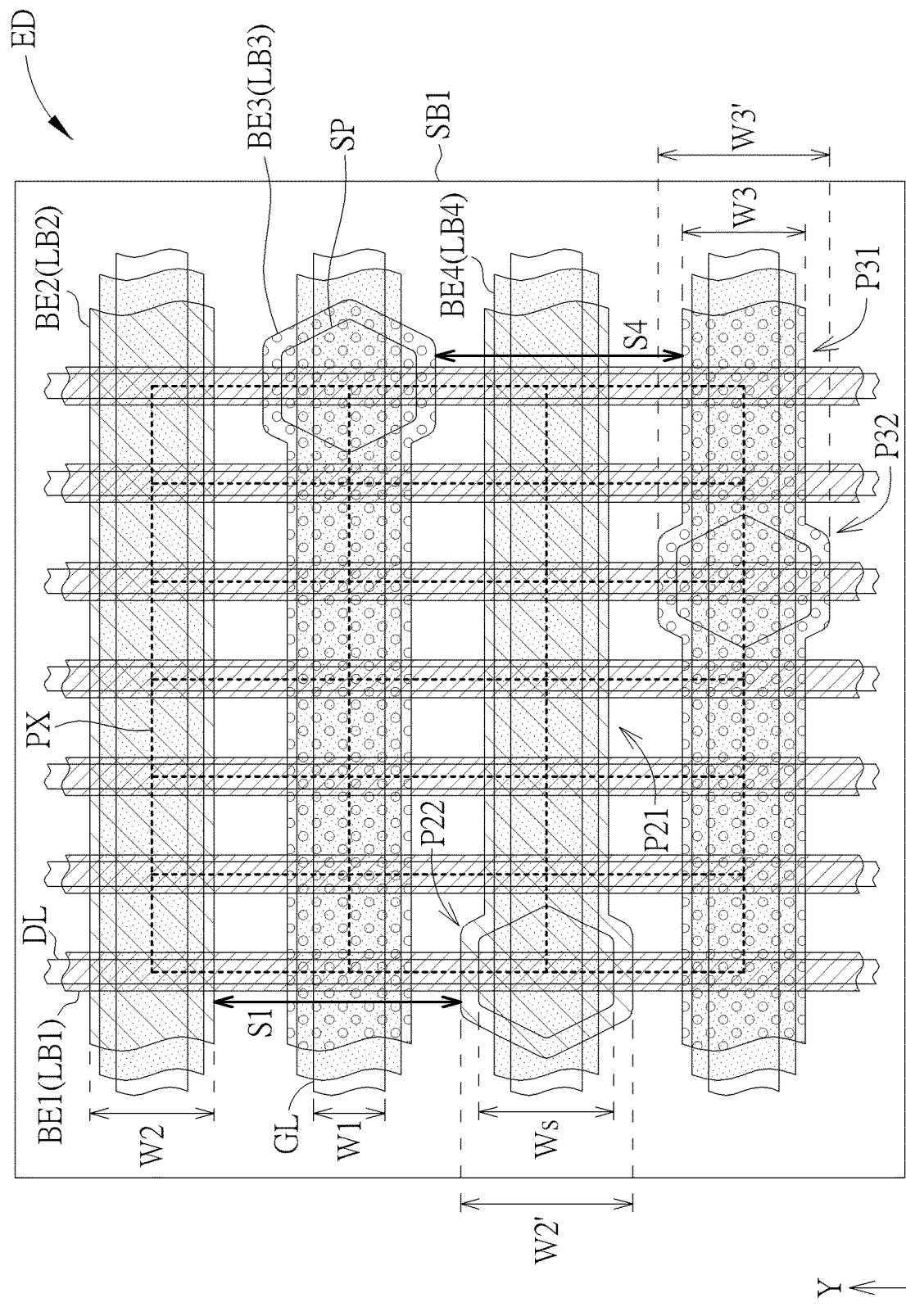
FIG. 10 is a schematic diagram of a partial top-view according to an eighth embodiment of the electronic device of the present disclosure.

Referring to FIG. 10, FIG. 10 is a schematic diagram of a partial top-view according to an eighth embodiment of the electronic device of the present disclosure. Compared with the embodiment shown in FIG. 9, the electronic device ED shown in FIG. 10 has the arrangement that the light-shielding layer LB2 and the light-shielding layer LB3 are alternately disposed corresponding to the gate lines GL and the spacers SP, which means the light-shielding layer LB2 and the light-shielding layer LB3 respectively correspond to different portions of the spacers SP. The configuration and pattern of the light-shielding elements BE2 included in the light-shielding layer LB2 may refer to FIG. 9, which will not be described again. In another aspect, the electronic device ED shown in FIG. 10 further includes the light-shielding layer LB3 which includes a plurality of light-shielding elements BE3, and the light-shielding elements BE3 may be respectively arranged corresponding to the odd-numbered gate lines GL and the spacers SP disposed on the odd-numbered gate lines GL. In other words, the light-shielding elements BE3 and the light-shielding elements BE2 are arranged alternately in the first direction Y One light-shielding element BE3 may include first portions P31 and second portions P32, wherein the second portions P32 are the part of the light-shielding element BE3 corresponding to the spacers SP, and the first portions P31 are the part of the light-shielding elements BE3 does not correspond to the spacers SP. In other words, the first portions P31 is the part of the light-shielding element BE3 corresponding to the part of the odd-numbered gate line GL not overlapping the spacers SP. One first portion P31 is a strip extending along the second direction X and may be located between two second portions P32 or connected to one second portion P32. The first portion P31 may have a width W3 in the first direction Y, and the second portion P32 may have a maximum width W3' in the first direction Y, wherein the width W3' is greater than the width W3, and the width W3' is also greater than the width Ws of the spacers SP in the first direction Y Under this design, the shortest distance S1 between adjacent light-shielding elements BE2 in the first direction Y is greater than at least one gate line GL, while the shortest distance S4 between adjacent light-shielding elements BE3 is also greater than least one gate line GL, and the distance S3 and the distance S4 may range from 1.5 micrometers to 30 micrometers respectively. Since the distance S3 and/or the distance S4 can be as high as 30 micrometers, the exposure processes of the light-shielding layer LB2 and the light-shielding layer LB3 can still have good patterning performance even if the materials of these light shielding layers include black matrix materials or other organic photosensitive materials. It should be noted that the light-shielding layer LB2 and the light-shielding layer LB3 are two different light-shielding material layers respectively, that is, they are patterned separately in two exposure processes. However, the order of manufacturing these two light-shielding material layers may be interchanged, and since the light-shielding layer LB2 and the light-shielding layer LB3 do not have overlapping portions with each other in the display region, the light-shielding layer LB2 and the light-shielding layer LB3 may be aligned in the third direction Z, that is, the distance between the light-shielding layer LB2 and the substrate SB1 may be the same as the distance between the light-shielding layer LB3 and the substrate SB1, but not limited thereto. In a variant embodiment, the distance between the light-shielding layer LB2 and the substrate SB1 may be different from the distance between the light-shielding layer LB3 and the substrate SB1, and the distances between the two light-shielding layers and the substrate SB1 may refer to FIG. 2 for instance.

In a variation of the eighth embodiment of the electronic device of the present disclosure, the width W3 of the first portions P31 of the light-shielding elements BE3 in the first direction Y and the width W2 of the first portions P21 of the light-shielding elements BE2 in the first direction Y may be both smaller than the width W1 of the gate lines GL in the first direction Y. For example, the width W3 and the width W2 may be similar to the width W2 in the embodiment shown in FIG. 7. In other words, the pattern of the light-shielding elements BE2 and the pattern of the light-shielding elements BE3 may be respectively similar to the light-shielding elements BE2 in the embodiment shown in FIG. 7, but not limited thereto. In another variant embodiment of the eighth embodiment of the electronic device of the present disclosure, the first portion P21 of the light-shielding elements BE2 may replace the first portion P31 of the light-shielding elements BE3, while the light-shielding elements BE3 may only retain the portions corresponding to the spacers SP, which is the second portions P32, and the width W2 of the first portions P21 of the light-shielding elements BE2 may be smaller than the width W1 of the gate lines GL. In other words, the light-shielding layer LB2 may include a plurality of light-shielding elements BE2, whose first portions P21 respectively corresponds to one gate line GL, and the light-shielding elements BE2 corresponding to the even-numbered gate lines GL further have the second portions P22, which correspond to the spacers SP on the even-numbered gate lines GL, while the light-shielding elements BE3 of the light-shielding layer LB3 correspond to the spacers SP on the odd-numbered gate lines GL. The pattern or shape of the light-shielding elements BE3 may refer to the embodiment shown in FIG. 1, but not limited thereto.

According to the present disclosure, the display device includes a first layer of light-shielding layer disposed corresponding to the data lines and includes a second layer of light-shielding layer disposed corresponding to the gate lines, and the second layer of light-shielding layer may optionally be disposed further corresponding to the spacers. The electronic device of the present disclosure may further optionally include a third layer of light-shielding layer and/or a fourth layer of light-shielding layer corresponding to the spacers and/or gate lines, wherein the patterns and arrangements of the second layer to the fourth layer of light-shielding layers can be disposed in conjunction with each other (such as in a complementary arranging way), or even alternately corresponding to the gate lines and/spacers. Under the above design, the distance between adjacent light-shielding elements included in the same light-shielding layer can be increased so as to improve the patterning performance of the light-shielding layers. This advantage resulted from the design is particularly significant when the light-shielding layer includes black matrix materials or organic photosensitive materials. Furthermore, when one of the light-shielding layers includes metal materials, the metal light-shielding layer may be used to form the closer patterns (i.e., the patterns with smaller interval) to improve the overall process yields since the exposure process of metal materials may obtain a finer or more accurate pattern. For example, a metal light-shielding layer may be used to correspond to the spacers. The structural design of the electronic device of the present disclosure can take into account of shielding metal wires and spacers and improving the contrast. According to the present disclosure, by the design of using two to four layers of light-shielding layers respectively corresponding to and shielding different components in the display panel, the visual perception and performance of the display surface and/or the overall contrast of the displayed image can be effectively improved.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
   a substrate;
   a plurality of data lines disposed on the substrate and extending along a first direction;
   a plurality of gate lines disposed on the substrate and extending along a second direction, wherein the first direction is different from the second direction;
   a plurality of spacers disposed on the substrate;
   a first light-shielding layer comprising a plurality of first light-shielding elements arranged corresponding to one of the plurality of data lines respectively and extending along the first direction;
   a second light-shielding layer comprising a plurality of second light-shielding elements arranged corresponding to one of the plurality of gate lines and extending along the second direction; and
   a third light-shielding layer arranged corresponding to at least one portion of the plurality of spacers;
   wherein at an overlap of the first light-shielding layer, the second light-shielding layer and the third light-shielding layer, the first light-shielding layer, the second light-shielding layer and the third light-shielding layer have different distances from the substrate respectively.

2. The electronic device as claimed in claim 1, wherein a width of one of the plurality of second light-shielding elements in the first direction is greater than a width of the corresponding one of the plurality of gate lines in the first direction.

3. The electronic device as claimed in claim 1, wherein a width of one of the plurality of second light-shielding elements in the first direction is less than a width of the corresponding one of the plurality of gate lines in the first direction.

4. The electronic device as claimed in claim 1, wherein the third light-shielding layer comprises a plurality of third light-shielding elements arranged corresponding one of the plurality of spacers respectively, and a maximum width of each of the plurality of third light-shielding elements in the first direction is greater than a width of a corresponding one of the plurality of spacers in the first direction.

5. The electronic device as claimed in claim 1, further comprising a display medium layer disposed on the plurality of data lines and the plurality of gate lines, wherein the display medium layer is disposed between the first light-shielding layer, the second light-shielding layer, and the third light-shielding layer and the plurality of gate lines.

6. The electronic device as claimed in claim 5, further comprising a fourth light-shielding layer disposed between the substrate and the plurality of gate lines.

7. The electronic device as claimed in claim 6, wherein the fourth light-shielding layer comprises a plurality of four light-shielding elements arranged corresponding to one of the plurality of gate lines respectively and extending along the second direction.

8. The electronic device as claimed in claim 7, wherein a width of each of the plurality of fourth light-shielding elements in the first direction is greater than a width of each of the plurality of gate lines in the first direction, a width of each of the plurality of second light-shielding elements in the first direction is greater than the width of each of the plurality of fourth light-shielding elements in the first direction.

9. The electronic device as claimed in claim 5, wherein the third light-shielding layer comprises a plurality of third light-shielding elements arranged corresponding to one of the plurality of spacers respectively, and each of the plurality of third light-shielding elements has plural widths.

10. The electronic device as claimed in claim 1, wherein the third light-shielding layer is disposed between the plurality of gate lines and the substrate.

11. The electronic device as claimed in claim 10, wherein a width of each of the plurality of second light-shielding elements in the first direction is less than a width of a corresponding one of each of the plurality of gate lines in the first direction.

12. The electronic device as claimed in claim 1, wherein the second light-shielding layer is disposed between the plurality of gate lines and the substrate.

13. The electronic device as claimed in claim 12, wherein the third light-shielding layer comprises a plurality of third light-shielding elements extending along the second direction, one of the plurality of third light-shielding elements comprises a first portion and a second portion, wherein the first portion is arranged corresponding to one of the plurality of gate lines, the second portion is arranged corresponding to one of the plurality of spacers, a width of the first portion in the first direction is less than a width of the corresponding one of the plurality of gate lines in the first direction, and a width of the second portion in the first direction is greater than a width of the corresponding one of the plurality of spacers in the first direction.

14. The electronic device as claimed in claim 1, further comprising a fourth light-shielding layer disposed corresponding to another portion of the plurality of spacers.

15. The electronic device as claimed in claim 14, wherein the third light-shielding layer comprises a plurality of third light-shielding elements extending along the second direction, the fourth light-shielding layer comprises a plurality of fourth light-shielding elements extending along the second direction, and the plurality of third light-shielding elements and the plurality of fourth light-shielding elements are disposed alternately along the first direction.

16. The electronic device as claimed in claim 15, wherein one of the plurality of third light-shielding elements has plural widths in the first direction, and one of the plurality of fourth light-shielding elements has plural widths in the first direction.

17. The electronic device as claimed in claim 1, wherein the electronic device comprises a plurality of sub-pixels, the second light-shielding layer is disposed between the plurality of gate lines and the substrate, and each of the second light-shielding elements has a length in the second direction greater than twice of a pixel pitch of the plurality of sub-pixels in the second direction.

18. The electronic device as claimed in claim 1, wherein the electronic device comprises a plurality of sub-pixels, and a spacing between any two adjacent light-shielding elements of the plurality of second light-shielding elements in the first direction is greater than a pixel pitch of the plurality of sub-pixels in the first direction.

19. The electronic device as claimed in claim 1, wherein the third light-shielding layer comprises a plurality of third light-shielding elements extending along the second direction, and one of the plurality of third light-shielding elements has plural widths in the first direction.

20. The electronic device as claimed in claim 19, wherein each of the third light-shielding elements comprises a first portion and a second portion, the first portion is disposed corresponding to one of the plurality of gate lines, and the second portion is disposed corresponding to one of the plurality of spacers, and a width of the first portion in the first direction is less than a maximum width of the second portion in the first direction.

* * * * *